United States Patent
Okino et al.

(10) Patent No.: US 10,754,367 B2
(45) Date of Patent: Aug. 25, 2020

(54) SYSTEM AND METHOD TO CONTROL POWER GRID WITH DISTRIBUTED POWER REGENERATION SOURCES

(71) Applicant: KYOCERA Corporation, Kyoto-shi, Kyoto (JP)

(72) Inventors: Kenta Okino, Yokohama (JP); Kazutaka Nakamura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 19 days.

(21) Appl. No.: 15/756,049

(22) PCT Filed: Aug. 26, 2016

(86) PCT No.: PCT/JP2016/075080
§ 371 (c)(1),
(2) Date: Feb. 27, 2018

(87) PCT Pub. No.: WO2017/038719
PCT Pub. Date: Mar. 9, 2017

(65) Prior Publication Data
US 2018/0253115 A1      Sep. 6, 2018

(30) Foreign Application Priority Data

Aug. 28, 2015 (JP) .................................. 2015-169797

(51) Int. Cl.
*G05F 1/66* (2006.01)
*H02J 3/38* (2006.01)
(Continued)

(52) U.S. Cl.
CPC .............. *G05F 1/66* (2013.01); *G05B 15/02* (2013.01); *H02J 3/38* (2013.01); *H02J 13/00* (2013.01); *H04Q 9/00* (2013.01)

(58) Field of Classification Search
CPC ..... G05F 1/66; G05B 15/02; H02J 3/38; H02J 13/00; H04Q 9/00
See application file for complete search history.

(56) References Cited

U.S. PATENT DOCUMENTS

| | | | |
|---|---|---|---|
| 4,910,956 A * | 3/1990 | Legore | F02C 9/36 60/39.281 |
| 10,135,246 B2 * | 11/2018 | Behrangrad | H02J 3/14 |

(Continued)

FOREIGN PATENT DOCUMENTS

| | | | |
|---|---|---|---|
| JP | 2004-274812 A | | 9/2004 |
| JP | 2004274812 A | * | 9/2004 |

(Continued)

OTHER PUBLICATIONS

International Search Report dated Nov. 15, 2016, issued by Japan Patent Office for International Application No. PCT/JP2016/075080.

*Primary Examiner* — Thomas C Lee
*Assistant Examiner* — Charles Cai
(74) *Attorney, Agent, or Firm* — Procopio Cory Hargreaves and Savitch LLP (57) ABSTRACT

A communication apparatus comprises a controller configured to control an output of a reverse power flow-power source that generates power for performing a reverse power flow from a facility to a power grid; and a transmitter configured to transmit reverse power flow-power source information about the reverse power flow-power source to a management server that transmits a power instruction message.

10 Claims, 4 Drawing Sheets

(51) Int. Cl.
*H02J 13/00* (2006.01)
*H04Q 9/00* (2006.01)
*G05B 15/02* (2006.01)

(56) References Cited

U.S. PATENT DOCUMENTS

| | | | | |
|---|---|---|---|---|
| 2002/0036430 | A1* | 3/2002 | Welches | F02G 1/043 307/18 |
| 2006/0276938 | A1* | 12/2006 | Miller | G06Q 50/06 700/295 |
| 2014/0122181 | A1* | 5/2014 | Fisera | G06Q 30/0202 705/7.31 |
| 2014/0277811 | A1* | 9/2014 | Dunn | G08B 25/08 700/297 |
| 2015/0267683 | A1* | 9/2015 | Ubben | F03D 7/00 290/44 |
| 2016/0033986 | A1* | 2/2016 | Kamel | H02J 3/381 700/295 |
| 2016/0241040 | A1* | 8/2016 | Kusunose | H02J 3/382 |

FOREIGN PATENT DOCUMENTS

| | | | |
|---|---|---|---|
| JP | 2007-274827 | A | 10/2007 |
| JP | 2007274827 | A * | 10/2007 |
| JP | 2010-051117 | A | 3/2010 |
| JP | 2012-196116 | A | 10/2012 |
| JP | 2012-244665 | A | 12/2012 |
| JP | 2012-249487 | A | 12/2012 |
| JP | 2014-072976 | A | 4/2014 |
| JP | 2015-015865 | A | 1/2015 |
| WO | 2012/144044 | A1 | 10/2012 |

* cited by examiner

| ITEM | REMARKS |
|---|---|
| POWER SELLING PRICE INFORMATION | POWER SELLING PRICE, POWER SELLING AMOUNT, AND TIME ZONE |
| FAILURE INFORMATION | PRESENCE OR ABSENCE OF FAILURE AUTOMATIC RECOVERY OR MANUAL RECOVERY |
| MAINTENANCE INFORMATION | SCHEDULE |
| VOLTAGE INFORMATION | WHETHER VOLTAGE OF POWER GRID REACHES SUPPRESSION TARGET VOLTAGE |
| INSTALLATION INFORMATION | INSTALLATION DATE AND SERVICE LIFE |
| DISCONNECTION INFORMATION | CURRENT DISCONNECTION FUTURE DISCONNECTION SCHEDULE |

SYSTEM AND METHOD TO CONTROL POWER GRID WITH DISTRIBUTED POWER REGENERATION SOURCES

TECHNICAL FIELD

The present invention relates to a communication apparatus, a management server, and a communication method.

BACKGROUND ART

There has been known a reverse power flow suppression message requesting suppression of a reverse power flow amount from a facility to a power grid. The reverse power flow suppression message is transmitted to a facility from a management server belonging to an electric power company, a power distribution company, or the like through a communication line (for example, Patent Literature 1).

SUMMARY

A communication apparatus according to a first aspect comprises a controller configured to control an output of a reverse power flow-power source that generates power for performing a reverse power flow from a facility to a power grid; and a transmitter configured to transmit reverse power flow-power source information about the reverse power flow-power source to a management server that transmits a power instruction message.

A management server according to a second aspect comprises a transmitter configured to transmit a power instruction message; a receiver configured to receive, from a facility, reverse power flow-power source information about a reverse power flow-power source, wherein the reverse power flow-power source generates power for performing a reverse power flow from the facility to a power grid; and a controller configured to determine, based on the reverse power flow-power source information, at least one of a transmission target and contents of the power instruction message.

A third aspect is a communication method comprising a step A of controlling by a communication apparatus, an output of a reverse power flow-power source that generates power for performing a reverse power flow from a facility to a power grid; a step B of transmitting by the communication apparatus, reverse power flow-power source information about the reverse power flow-power source to a management server that transmits a power instruction message; and a step C of determining by the management server, based on the reverse power flow-power source information, at least one of a transmission target and contents of the power instruction message.

DESCRIPTION OF EMBODIMENTS

Hereinafter, a first embodiment will be described with reference to the drawings. In the following description of the drawings, the same or similar reference numerals are assigned to the same or similar parts.

However, it should be noted that the drawings are schematic and ratios of dimensions and the like may be different from actual ones. Therefore, concrete dimensions and the like should be determined with reference to the following explanation. In addition, it is a matter of course that the drawings also include parts having different dimensional relationships or ratios between the drawings.

SUMMARY OF DISCLOSURE

When a reverse power flow amount is suppressed by transmission of a reverse power flow suppression message, if a reverse power flow suppression message is uniformly transmitted to all facilities managed by a management server, there is a possibility that an inefficient reverse power flow suppression control will be performed on the entire groups of facilities managed by the management server.

A communication apparatus according to the summary of disclosure comprises a controller configured to control an output of a reverse power flow-power source that generates power for performing a reverse power flow from a facility to a power grid; and a transmitter configured to transmit reverse power flow-power source information about the reverse power flow-power source to a management server that transmits a power instruction message.

In the summary of the disclosure, the communication apparatus transmits the reverse power flow-power source information about the reverse power flow-power source to the management server. Therefore, the management server can grasp information about whether the facility can perform the control of the reverse power flow or whether the facility has a possibility of performing the reverse power flow, based on the reverse power flow-power source information. Therefore, it is possible to efficiently control the reverse power flow as the entire groups of facilities managed by the management server.

Embodiment (Power Management System)

Hereinafter, a power management system according to an embodiment will be described.

Figure 1:
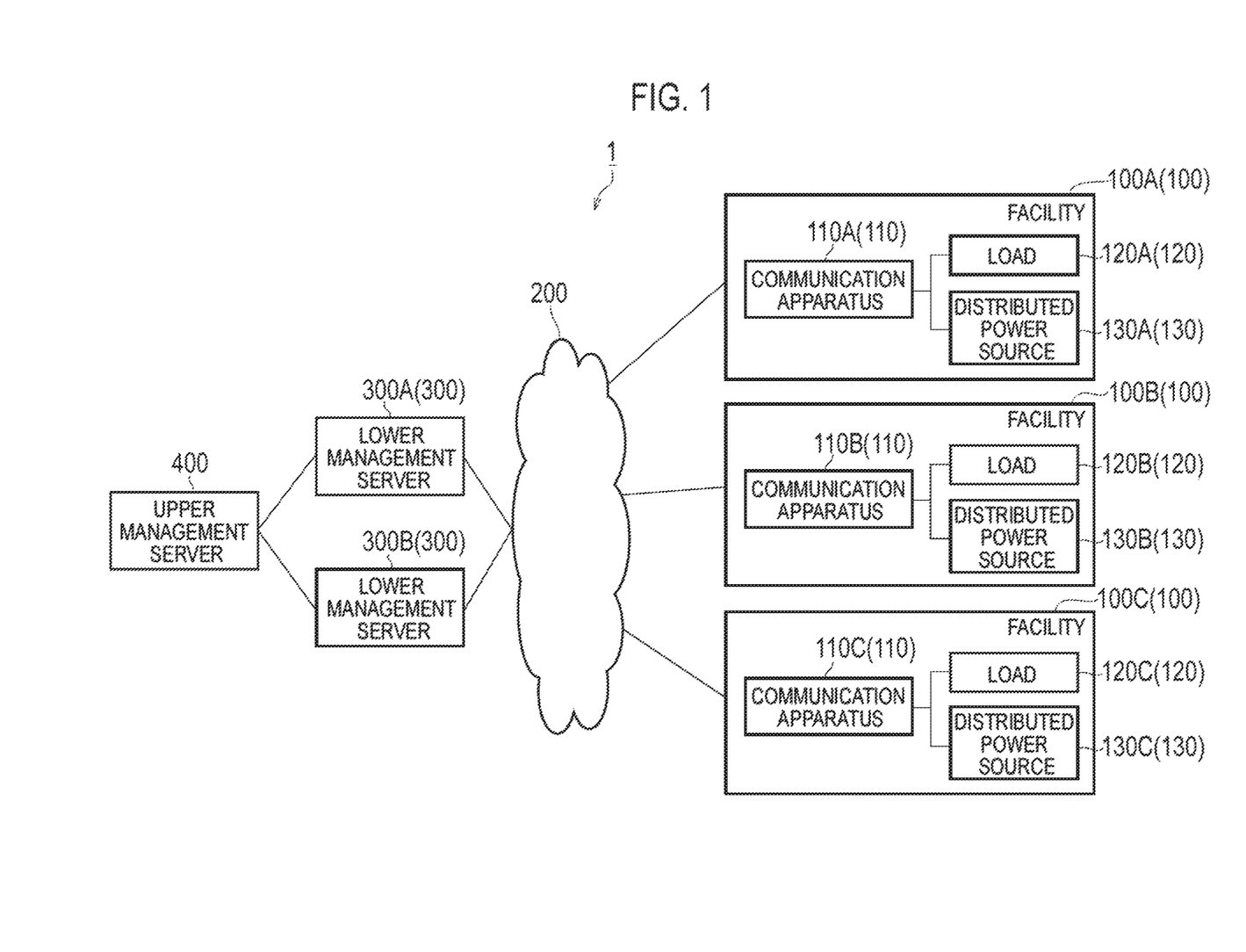
FIG. 1 is a diagram illustrating a power management system 1 according to an embodiment.

As illustrated in FIG. 1, the power management system 1 includes a facility 100, a network 200, a lower management server 300, and an upper management server 400.

The facility 100 includes a communication apparatus 110, a load 120, and a distributed power source 130. The communication apparatus 110 is a communication apparatus provided in the facility 100 and communicates with the lower management server 300 or the upper management server 400.

The communication apparatus 110 is an apparatus (energy management system) configured to manage power of an equipment provided in the facility 100 or a power conditioning system (PCS) configured to control the distributed power source 130. The load 120 is an equipment configured to consume power. The load 120 includes an equipment, for example, a refrigerator, an illumination, an air conditioner, a television, and the like. The load 120 may include one equipment, or may include a plurality of equipments. The distributed power source 130 is an equipment configured to generate power. The distributed power source 130 includes an equipment, for example, a solar cell, a wind power generation, a fuel cell, a gas engine generator, a storage battery, and the like. The distributed power source 130 may include one equipment, or may include a plurality of equipments.

In the embodiment, the facility 100 includes a reverse power flow-power source that is the distributed power source 130 configured to generate power for performing a reverse power flow from the facility 100 to the power grid. The reverse power flow-power source is, for example, a solar cell, but is not limited thereto. The reverse power flow-power source may be an equipment such as a fuel cell or a storage battery.

In the embodiment, a facility 100A, a facility 100B, and a facility 100C are illustrated as examples of the facility 100. The facility 100A, the facility 100B, and the facility 100C have similar configurations. In the embodiment, the facility 100 includes, without limitation, the three facilities 100A to 100C. The facility 100 may be one facility 100 or a plurality of facility 100.

The network 200 may be a communication means for connecting the facility 100 and the lower management server 300. Specifically, the network 200 is a communication line, for example, the Internet. The network 200 is provided by, for example, a provider that each facility 100 has a contract with. The network 200 may be a dedicated line.

The lower management server 300 is a server belonging to an aggregator such as a power distribution company. The aggregator is a company which manages a forward power flow amount or a reverse power flow amount of the facility 100 that has a contract with the aggregator.

In the embodiment, a lower management server 300A and a lower management server 300B are illustrated as examples of the lower management server 300. The lower management server 300A and the lower management server 300B have similar configurations. The lower management server 300 may include one lower management server or a plurality of lower management servers. In addition, the lower management server 300 may be integrated with the upper management server 400.

The upper management server 400 is a server belonging to an electric power company such as a power company. The electric power company may entrust management for the forward power flow amount or the reverse power flow amount of the facility 100 to the aggregator.

In the embodiment, the upper management server 400 transmits a forward power flow suppression message (for example, Demand Response (DR)) requesting a suppression of a forward power flow amount (a supply amount of power) from the power grid to the facility 100. The upper management server 400 transmits a reverse power flow suppression message requesting a suppression of a reverse power flow amount from the facility 100 to the power grid. In the embodiment, the forward power flow suppression message and the reverse power flow suppression message are collectively referred to as a power instruction message.

Here, the forward power flow suppression message includes information indicating a suppression degree of a power amount supplied from the power grid to the facility 100. The suppression degree may be represented by an absolute value of the power amount (for example, ○○ kW). Alternatively, the suppression degree may be represented by a relative value of the power amount (for example, decrease by ○○ kW). Alternatively, the suppression degree may be represented by a suppression ratio of the power amount (for example, ○○%). Alternatively, the suppression degree may be represented by a predetermined step (for example, 0, 1, 2, and 3).

Alternatively, the forward power flow suppression message may include information indicating a power purchase price that is a consideration for the forward power flow from the power grid. By setting a high price as the power purchase price, the power amount supplied from the power grid to the facility 100 is expected to be suppressed.

The reverse power flow suppression message includes information indicating a suppression degree of a power amount output from the facility 100 to the power grid. Specifically, the reverse power flow suppression message includes information indicating a suppression degree of an output of a distributed power source. The suppression degree may be represented by an absolute value of the output of the distributed power source (for example, ○○ kW). Alternatively, the suppression degree may be represented by a relative value of the output of the distributed power source (for example, decrease by ○○ kW). Alternatively, the suppression degree may be represented by a predetermined step (for example, 0, 1, 2, and 3). Alternatively, the suppression degree may be represented by a suppression ratio of the output of the distributed power source (for example, ○○%). When the distributed power source is installed in the facility 100, the suppression ratio may be a ratio to an output (hereinafter, equipment certified output) certified as an output capability of a PCS that controls the distributed power source. If the output capability of the distributed power source is different from the output capability of the PCS, the equipment certified output is the smaller one of these output capabilities. In a case where a plurality of PCSs are installed, the equipment certified output is the sum of the output capabilities of the plurality of PCSs.

Here, a format that complies with an automated demand response (ADR) may be used as formats of the forward power flow suppression message and the reverse power flow suppression message. The communication between the upper management server 400 and the lower management server 300 and the communication between the lower management server 300 and the facility 100 may be performed according to a method that complies with the same standard. As a method complying with this same standard, for example, a method complying with an Open ADR standard (for example, Open ADR 2.0 or the like) can be used.

(Communication Apparatus)

Figure 2:
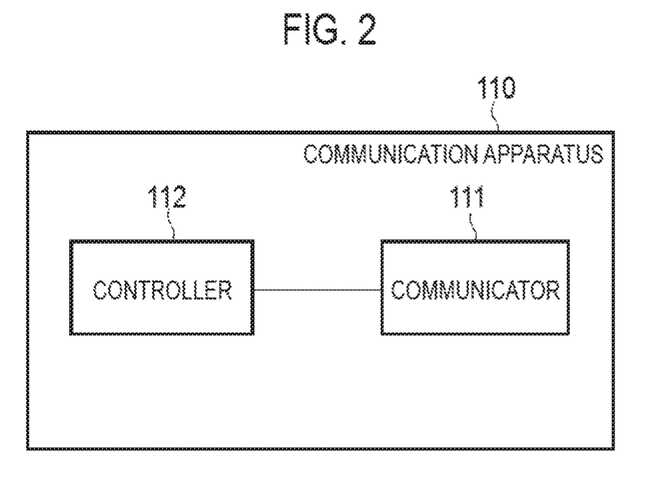
FIG. 2 is a diagram illustrating a communication apparatus 110 according to an embodiment.

Hereinafter, a communication apparatus according to an embodiment will be described. The communication apparatus 110 includes a communicator 111 and a controller 112.

The communicator 111 is configured by a communication module or the like, and performs communication with the lower management server 300 or the upper management server 400. Here, a case where the communicator 111 performs communication with the lower management server 300 is exemplified. For example, the communicator 111 receives, from the lower management server 300, a power instruction message including the forward power flow suppression message or the reverse power flow suppression message through the network 200 (communication line). It should be noted that the communicator 111 according to the embodiment receives at least the reverse power flow suppression message.

In the embodiment, the communicator 111 transmits the reverse power flow-power source information about the reverse power flow-power source to the lower management server 300. The details of the reverse power flow-power source information will be described later, but the reverse power flow-power source information includes information corresponding to at least one of items such as power selling price information, failure information, maintenance information, voltage information, installation information, and disconnection information (see FIG. 4).

The controller 112 is configured by a CPU, a memory, or the like, and controls the communicator 111. For example, the controller 112 controls at least the output of the reverse power flow-power source. The controller 112 performs suppression control of the forward power flow or the reverse power flow, based on the power instruction message.

(Management Server)

Figure 3:
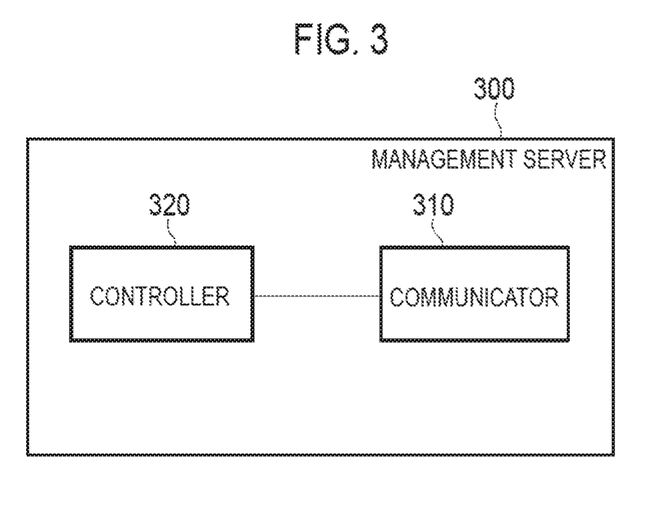
FIG. 3 is a diagram illustrating a lower management server 300 according to an embodiment.

Hereinafter, a management server according to an embodiment will be described. Here, the lower management server 300 is exemplified as the management server. However, the management server may be the upper management server 400. As illustrated in FIG. 3, the lower management server 300 includes a communicator 310 and a controller 320.

The communicator 310 is configured by a communication module or the like, and performs communication with the facility 100 and the upper management server 400. For example, the communicator 310 receives, from the upper management server 400, a power instruction message including the forward power flow suppression message or the reverse power flow suppression message. The communicator 310 receives reverse power flow-power source information from the facility 100 (communication apparatus 110).

The communicator 310 transmits, to the facility 100, a power instruction message including the forward power flow suppression message or the reverse power flow suppression message through the network 200 (communication line). Since the management of the forward power flow amount or the reverse power flow amount of the facility 100 is entrusted to the aggregator (lower management server 300), the contents of the power instruction message transmitted to the facility 100 may be different from the contents of the power instruction message received from the upper management server 400. Specifically, the power instruction message transmitted from the upper management server 400 may be one to be achieved by each facility 100, or one to be achieved by a plurality of facilities 100. If the power instruction message is one to be achieved by the plurality of facilities 100, the lower management server 300 selects an appropriate facility 100. Then, the lower management server 300 transmits, to the selected facility 100, the power instruction message to be achieved by each facility 100.

The controller 320 is configured by a CPU, a memory, or the like, and controls the communicator 310.

For example, the controller 320 determines a supply and demand adjustment plan based on the reverse power flow-power source information received from the facility 100 (communication apparatus 110). The supply and demand adjustment plan is a plan of the transmission target (facility 100) of the power instruction message and the contents of the power instruction message (the suppression amount of the forward power flow or the suppression amount of the reverse power flow). The supply and demand adjustment plan may be determined for each unit time length (for example, 30 minutes) in a period in which the suppression of the forward power flow amount or the reverse power flow amount is instructed by the power instruction message received from the upper management server 400.

(Reverse Power Flow-Power Source Information)

Hereinafter, reverse power flow-power source information according to an embodiment will be described.

Figure 4:
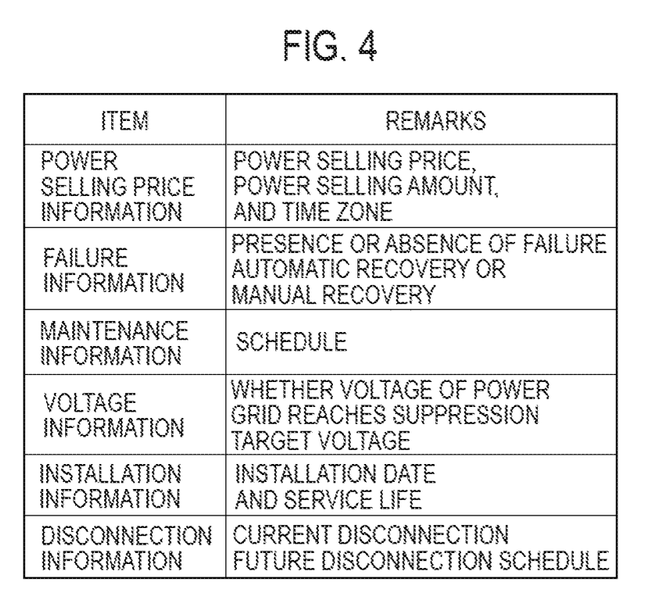
FIG. 4 is a diagram illustrating reverse power flow-power source information according to an embodiment.

As illustrated in FIG. 4, the reverse power flow-power source information includes information corresponding to at least one of items such as power selling price information, failure information, maintenance information, voltage information, installation information, and disconnection information.

The "power selling price information" includes information indicating a power selling price of power accompanied by the reverse power flow from the facility 100 to the power grid. The power selling price is a consideration when power output from the reverse power flow-power source is purchased. More specifically, the power selling price is a consideration for surplus power obtained by excluding the power consumed at the facility 100 from the power output from the reverse power flow-power source. It should be noted that it is not limited to the surplus power, but it may be, for example, a consideration for the power purchased for all quantity, or a consideration for the power of reverse power flow by VPP to be described later. In addition, the power selling price information may include at least one of a power selling unit price and a power selling amount. By including the power selling amount in the power selling price information, the lower management server 300 can grasp how much the target facility 100 generates reverse power flow.

Generally, if the power selling price is high, the suppression control of the reverse power flow is disadvantageous. In this case, the lower management server 300 can preferentially select, as a transmission target of the reverse power flow suppression message, the facility 100 of which the power selling price is relatively low rather than the facility 100 of which the power selling price is relatively high. Alternatively, the lower management server 300 can assign, as a suppression amount of the reverse power flow, a large suppression amount to the facility 100 of which the power selling price is relatively low rather than the facility 100 of which the power selling price is relatively high. The lower management server 300 compensates a part of the power selling price of the facility 100, of which the power selling price with reduced suppression allocation is relatively high, for the facility 100, of which the power selling price with more suppression allocation is relatively low, thereby alleviating the inequality of loss due to the output suppression between the facilities 100 that are managed.

Here, the power selling price information may include information that associates a time zone to which the power selling price is applied with the power selling price. Therefore, the lower management server 300 can grasp the power selling price applied during the suppression period of the reverse power flow.

In addition, the power selling price information may include information about an output suppression schedule stored in the facility 100. As the power selling price information, all or part of the output suppression schedule may be used. In addition, the power selling price information may include a result value of a past output suppression.

The "failure information" includes information indicating whether the reverse power flow-power source has failed, and whether a method for the reverse power flow-power source to recover from failure is automatic recovery or manual recovery. If the reverse power flow-power source is in failure, the power from the reverse power flow-power source is not output at all, and the power from the reverse power flow-power source is lower than usual. Accordingly, the lower management server 300 can preferentially select the facility 100 including the failed reverse power flow-power source as the transmission target of the reverse power flow suppression message. The failure information may include information indicating that the reverse power flow-power source is normally operated (failure is not occurring).

Furthermore, if the recovery method is automatic recovery, it is considered that the recovery timing of the reverse power flow-power source is earlier than in the case where the recovery method is manual recovery. Therefore, if the reverse power flow-power source fails, the lower management server 300 may preferentially select the facility 100 including the reverse power flow-power source of the manual recovery rather than the facility 100 including the reverse power flow-power source of the automatic recovery as the transmission target of the reverse power flow suppression message, and thus the reverse power flow caused by the power output from the failed reverse power flow-power source starts at an early timing, thereby reducing the fact that the supply and demand adjustment plan goes wrong.

The "maintenance information" includes information indicating a schedule on which maintenance of the reverse power flow-power source is performed. The power is not output from the reverse power flow-power source in a period in which the maintenance is performed. Accordingly, the lower management server 300 can preferentially exclude the facility 100 including the reverse power flow-power source, in which the maintenance is performed in a period overlapping the suppression period of the reverse power flow, from the transmission target of the reverse power flow suppression message.

The "voltage information" includes information indicating whether the voltage of the power grid reaches a voltage to be suppressed in the reverse power flow (hereinafter, a suppression target voltage). If the voltage of the power grid reaches the suppression target voltage, it is impossible to perform the reverse power flow from the facility 100. Therefore, the lower management server 300 can preferentially select the facility 100, in which the voltage of the power grid reaches the suppression target voltage, as the transmission target of the reverse power flow suppression message.

Here, the voltage information may include information indicating an area where the voltage of the power grid reaches the suppression target voltage. Therefore, the lower management server 300 can grasp the facility 100 belonging to the area where the voltage of the power grid reaches the suppression target voltage.

Furthermore, the voltage information includes whether an abnormality occurs in the power grid. The abnormality of the power grid is a power failure of the power grid or a frequency abnormality of the grid. It should be noted that the voltage information may include information indicating that no abnormality has occurred in the power grid.

The "installation information" includes information indicating the installation date of the reverse power flow-power source (equipment certification acquisition date, or late date of equipment certification acquisition date and application date of connection contract to a power company). The reliability of the reverse power flow-power source with an old installation date is lower than the reliability of the reverse power flow-power source with a new installation date. In other words, the possibility that the reverse power flow will be normally performed by the reverse power flow-power source with the old installation date is lower than the possibility that the reverse power flow will be normally performed by the reverse power flow-power source with the new installation date. Therefore, the lower management server 300 preferentially selects the facility 100 including the reverse power flow-power source with the new installation date rather than the facility 100 including the reverse power flow-power source with the old installation date as the transmission target of the reverse power flow suppression message, thereby increasing the possibility that the reverse power flow will be suppressed.

The "disconnection information" includes information about at least one of whether the reverse power flow-power source is disconnected from the power grid and the schedule in which the reverse power flow-power source is disconnected from the power grid. If the reverse power flow-power source is disconnected from the power grid, it is impossible to perform the reverse power flow from the facility 100. Accordingly, the lower management server 300 can preferentially exclude the facility 100 including the reverse power flow-power source disconnected from the power grid from the transmission target of the reverse power flow suppression message. Alternatively, the lower management server 300 may preferentially exclude the facility 100 including the reverse power flow-power source to be disconnected from the power grid during the suppression period of the reverse power flow from the transmission target of the reverse power flow suppression message.

In addition, the "disconnection information" may include information about a reconnection permission setting. The reconnection permission setting indicates whether the reconnection operation of restoring power after being disconnected from the grid due to power failure or the like is automatic.

(Communication Method)

Hereinafter, a communication method according to an embodiment will be described. Here, a case where a reverse power flow suppression message is transmitted as a power instruction message will be exemplified.

Figure 5:
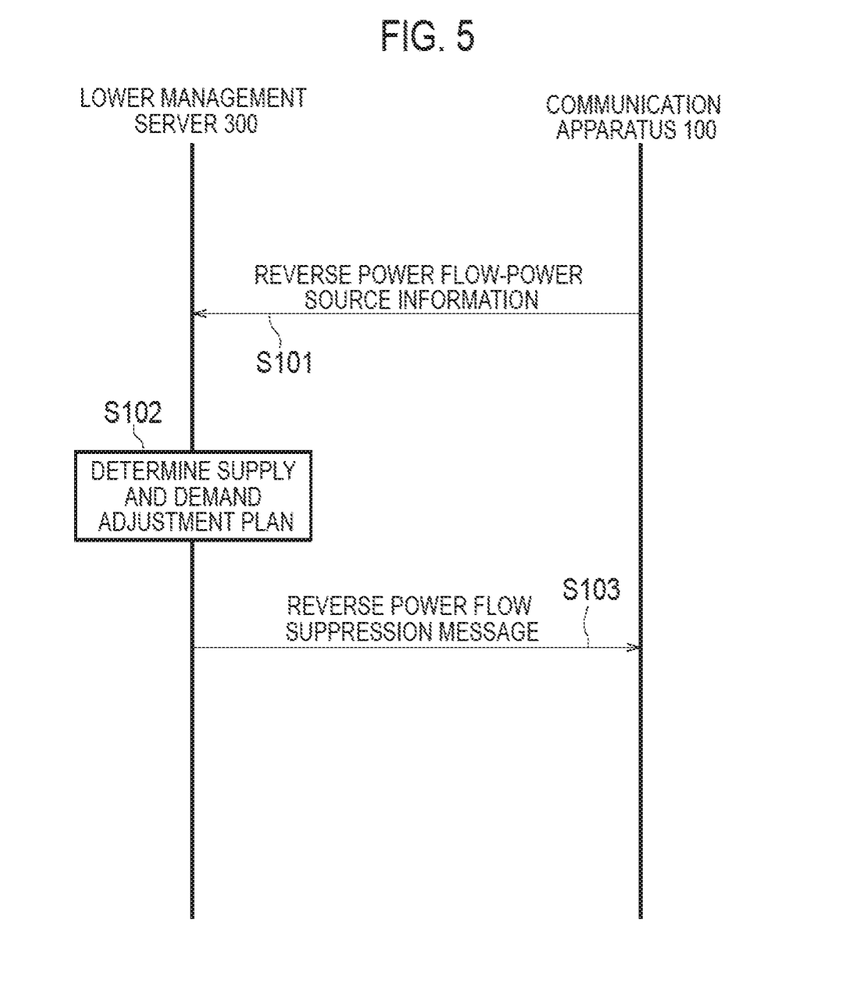
FIG. 5 is a diagram illustrating a communication method according to an embodiment.

As illustrated in FIG. 5, in step S101, the communication apparatus 110 transmits reverse power flow-power source information to the lower management server 300. As illustrated in FIG. 4, the reverse power flow-power source information includes information corresponding to at least one of items such as power selling price information, failure information, maintenance information, voltage information, installation information, and disconnection information.

In step S102, the lower management server 300 determines the supply and demand adjustment plan based on the reverse power flow-power source information. The supply and demand adjustment plan is a plan of the transmission target (facility 100) of the reverse power flow suppression message and the contents of the reverse power flow suppression message (the suppression amount of the forward power flow or the suppression amount of the reverse power flow).

In step S103, the lower management server 300 transmits the reverse power flow suppression message to the communication apparatus 110 based on the result of step S102.

(Operation and Effect)

The communication apparatus 110 according to the embodiment transmits the reverse power flow-power source information about the reverse power flow-power source to the lower management server 300. Therefore, the management server can grasp information about whether the facility can perform the suppression control of the reverse power flow or whether the facility has a possibility of performing the reverse power flow, based on the reverse power flow-power source information. Therefore, it is possible to efficiently perform the suppression control of the reverse power flow as the entire groups of facilities 100 managed by the lower management server 300.

In the embodiment, the lower management server 300 belongs to the aggregator entrusted from the electric power company with the management of the forward power flow amount or the reverse power flow amount of the facility 100, but according to the above-described configuration, the aggregator can respond to the entrustment of the electric power company.

[Modification 1]

Hereinafter, Modification 1 of the embodiment will be described. Differences from the embodiment will be described below. In Modification 1, a timing at which the facility 100 transmits the reverse power flow-power source information to the lower management server 300 will be described.

First, the facility 100 may transmit reverse power flow-power source information in response to a transmission request from the lower management server 300. The facility 100 may immediately transmit the reverse power flow-power source information in response to the transmission request from the lower management server 300, may transmit the reverse power flow-power source information at the timing specified by the transmission request of the lower management server 300, and may transmit the reverse power flow-power source information when a trigger (predetermined condition) specified by the transmission request of the lower management server 300 is satisfied.

The transmission request of the lower management server 300 may include information designating the timing of transmitting the reverse power flow-power source information, or may include information indicating a trigger to be satisfied for transmitting the reverse power flow-power source information. In addition, in the transmission request of the lower management server 300, it is possible to specify what kind of information the facility 100 transmits as the reverse power flow-power source information.

Second, the facility 100 may transmit the reverse power flow-power source information after the start of the suppression period of the reverse power flow. Therefore, after the start of the suppression period of the reverse power flow, the lower management server 300 can review the supply and demand adjustment plan.

Third, the facility 100 may transmit the reverse power flow-power source information at a predetermined timing corresponding to the suppression period of the reverse power flow. The predetermined timing is a timing before the start of the suppression period of the reverse power flow. For example, the predetermined timing is indicated by a time difference relative to the start timing of the suppression period of the reverse power flow (before ∘∘ minutes or before ∘∘ hours).

Other Embodiments

Although the present invention has been described with reference to the above-described embodiments, it should not be understood that the description and drawings constituting a part of this disclosure limit the present invention. From this disclosure, various alternative embodiments, examples, and operational technologies will become apparent to those skilled in the art.

In the embodiment, the suppression of the reverse power flow amount has been mainly described. However, the embodiment is not limited thereto. For example, the power instruction message may be a forward power flow amount suppression message requesting the suppression of the forward power flow amount. Alternatively, the embodiment can also be applied to a system that uses the distributed power source provided in the facility 100 as a virtual power plant (VPP). In such a case, the forward power flow suppression message or the reverse power flow suppression message may be read as a power source message requesting the control of the distributed power source installed in the facility 100. In addition, the term "suppression" may be read as "control". That is, the embodiment can also be applied to the case of increasing the forward power flow amount or the reverse power flow amount. In addition, when the distributed power source is operated and controlled as VPP, the operation instructed to the distributed power source may be transmitted as the suppression result.

In the embodiment, the communication between the upper management server 400 and the lower management server 300 and the communication between the lower management server 300 and the facility 100 are performed according to a method that complies with the Open ADR standard. However, the embodiment is not limited thereto. The communication between the lower management server 300 and the facility 100 may comply with a standard other than the Open ADR standard. Accordingly, a predetermined message exchanged between the lower management server 300 and the facility 100 may have a predetermined format defined by a standard other than the Open ADR standard.

The entire contents of Japanese Patent Application No. 2015-169797 (filed on Aug. 28, 2015) are incorporated herein by reference.

The invention claimed is:

1. A communication apparatus comprising:
a controller configured to control an output of a reverse power source, wherein the reverse power source generates power to perform a reverse power flow from a facility to a power grid; and
a transmitter configured to transmit reverse power source information about the reverse power source to a management server,
wherein
the reverse power source information comprised failure information indicating whether the reverse power source has failed and whether a method for the reverse power source to recover from failure is automatic recovery or manual recovery,
based on the reverse power source has failed, the management server transmits a power instruction message to a facility having the failed reverse power source,
based on the method for the reverse power source to recover from failure is automatic recovery or manual recovery, the management server transmits the power instruction message to the facility having the failed reverse power source with the manual recovery method earlier than transmitting the power instruction message to the facility having the failed reverse power source with the automatic recovery method, and
the power instruction message is a message instructing to suppress a reverse power flow amount, from the facility having the failed reversed power source to the power grid, to less than or equal to a predetermined value which is a non-zero value.

2. The communication apparatus according to claim 1, wherein the power instruction message comprises one of:
a power source message requesting a control of the reverse power source,
a reverse power flow suppression message requesting a suppression of a reverse power flow amount from the facility to the power grid, or
a forward power flow suppression message requesting a suppression of a forward power flow amount from the power grid to the facility.

3. The communication apparatus according to claim 1, wherein the reverse power source information comprises power selling price information indicating a power selling price of power accompanied by a reverse power flow from the facility to the power grid.

4. The communication apparatus according to claim 1, wherein the reverse power source information comprises maintenance information indicating a schedule on which maintenance of the reverse power source is performed.

5. The communication apparatus according to claim 1, wherein the reverse power source information comprises information about an abnormality of the power grid.

6. The communication apparatus according to claim 1, wherein the reverse power source information comprises voltage information indicating whether a voltage of the power grid reaches a suppression target voltage.

7. The communication apparatus according to claim 1, wherein the reverse power source information comprises information indicating an installation date of the reverse power source.

8. The communication apparatus according to claim 1, wherein the reverse power source information comprises at least one piece of information indicating at least one of whether the reverse power source is disconnected from the power grid or a schedule in which the reverse power source is disconnected from the power grid.

9. A management server comprising:
a transmitter configured to transmit a power instruction message;
a receiver configured to receive, from a facility, reverse power source information about a reverse power source, wherein the reverse power source generates power to perform a reverse power flow from the facility to a power grid; and
a controller configured to determine, based on the reverse power source information, at least one of a transmission target and contents of the power instruction message,
wherein
the reverse power source information comprises failure information indicating whether the reverse power source has failed and whether a method for the reverse power source to recover from failure is automatic recovery or manual recovery,
based on the failure information indicating that reverse power source has failed, the controller is configured to select, as the transmission target, a facility having the failed reverse power source,
based on the method for the reverse rower source to recover from failure is automatic recovery or manual recovery, the management server transmits the power instruction message to the facility having the failed reverse power source with the manual recovery method earlier than transmitting the power instruction message to the facility having the failed reverse power source with the automatic recovery method, and
wherein the power instruction message is a message instructing to suppress a reverse power flow amount, from the facility having the failed reverse power source to the grid, to less than or equal to a predetermined value which is a non-zero value.

10. A method comprising:
controlling an output of a reverse power source configured to perform a reverse power flow from a facility to a power grid;
transmitting reverse power source information about the reverse power source to a server;
determining, by the server, a transmission target and contents of a power instruction message; and
transmitting, by the server, the power instruction message to the transmission target,
wherein
the reverse power source information comprises failure information indicating whether the reverse power source has failed and whether a method for the reverse power source to recover from failure is automatic recover, or manual recovery,
based on the failure information indicating that reverse power source has failed, the controller is configured to select, as the transmission target, a facility having the failed reverse power source,
based on the method for the reverse power source to recover from failure is automatic recovery or manual recovery, the server transmits the power instruction message to the facility having the tailed reverse power source with the manual recovery method earlier than transmitting the power instruction message to the facility having the failed reverse power source with the automatic recovery method, and
wherein the power instruction message is a message instructing to suppress a reverse power flow amount, from the facility having the failed reverse power source to the grid, to less than or equal to a predetermined value is a non-zero value.

* * * * *